UNITED STATES PATENT OFFICE.

PIETER WICHERS WIERDSMA, OF SCHRANS, AND JOHANNES KUIPERS, OF LEEUWARDEN, NETHERLANDS, ASSIGNORS TO THE KUMA LIMITED, OF LONDON, ENGLAND.

SUBSTITUTE FOR VULCANITE, HARD WOODS, &c., AND PROCESS OF MANUFACTURING SAME.

SPECIFICATION forming part of Letters Patent No. 581,319, dated April 27, 1897.

Application filed September 5, 1896. Serial No. 605,022. (No specimens.)

*To all whom it may concern:*

Be it known that we, PIETER WICHERS WIERDSMA, of Schrans, near Leeuwarden, and JOHANNES KUIPERS, of Leeuwarden, Netherlands, manufacturers, subjects of the Queen of the Netherlands, have invented certain new and useful Improvements in Substitutes for Vulcanite, Hard Woods, &c., and Processes of Manufacturing the Same, of which the following is a specification.

This invention relates to a new or improved substance or product and the manufacture thereof, suitable for use as a substitute for vulcanite, hard woods, or other hard materials or for other uses or purposes for which same may be applicable, and has for its object to utilize certain parts of the potato or similar tubers, particularly the refuse or part of the refuse produced in the manufacture of potato-flour.

In the manufacture of potato-flour from potatoes (for instance, in the manner at present well known and carried on in Holland, Germany, and elsewhere) after the "flour" has been separated (in any suitable manner, for instance, by sifting) from the mass produced from the potatoes the refuse or part remaining is utilized or treated in the following manner, so as to produce therefrom the new or improved substance or product according to the present invention. This refuse, or part remaining after the extraction of the flour, will be found to contain water, peel, and fiber or cellular material, and in the form usually obtained—viz., in a pulpy mass—is estimated to contain about eighty-five per cent. of water, five per cent. of peel, and ten per cent. of cellular or fibrous material. The last named is the material which we have ascertained to contain properties suitable for being treated and producing the substance according to our present invention, as follows:

The aforesaid refuse is mixed with water (advantageously a copius supply of cold water) and stirred well or otherwise agitated to obtain a plastic or pulpy mass or paste. This mass is then submitted to any suitable separating process or action (for instance, sieving) to separate or remove the particles or larger parts that formed the peel, (which latter is waste, or may be utilized for any purpose for which it may be found suitable.) This sifting or assorting process or separating action should be done very carefully, so that if possible a minimum (if any) of the peel remains in the mass. The mass is now further washed (advantageously with pure cold water) with the object of removing dirt and bad smell and to make the mass neutral, and for these purposes or any of them any suitable chemical, such as an alkali or other material, may be added, if required. This done, the mass may now be bleached, if desired, in any suitable manner, or same may be dyed in any suitable manner and color desired, and is dried. The mass having been thus treated and thoroughly dried is now ground to a very fine or suitable powder, and this powder or finely-ground material, if necessary, may now be sifted through a fine sieve, (for instance, a cloth sieve, such as is used in flour-milling,) or other suitable means may be employed to obtain a thoroughly fine powder, which should be homogeneous or of a regular degree of fineness throughout. By this last-named separating (sifting) process, if used, every particle of peel that might not have been removed before the last-named washing process is now removed for the reason that the peel does not grind up into a fine or impalpable powder like the rest of the mass. The powder thus obtained is now ready for molding under pressure into any suitable articles, forms, or shapes, or same may be molded or formed under pressure into sheets or blocks or other forms, which can afterward be cut, carved, turned, or worked in any suitable manner into any suitable article or shape, and the aforesaid molding can be done by simply pressing this powder under great pressure without moistening same or mixing with any other solid or liquid material or materials, (unless desired,) as it has been found that the powder will, under sufficient pressure, form a cohesive solid mass.

In some cases it may be necessary or desirable to add other material or materials to the potato compound produced as hereinbefore described. For instance, any suitable waterproofing material may be added in suitable quantities, such as pitch, gums, varnish, albumen, or the like, either in a dry state or in solution, and same may be added at any convenient stage or stages in the process of making the herein-described potato compound.

Having thus described our invention, what we claim as new, and desire to secure by Letters Patent of the United States, is—

1. The process of forming a substance from the refuse remaining after the manufacture of potato-flour, which consists in mixing the said refuse with water, passing it through a sieve, washing, bleaching, and drying it, then grinding it into powder, sifting it, and molding it dry by great pressure, substantially as described.

2. The process of forming a substance from the refuse remaining after the manufacture of potato-flour, which consists in mixing the said refuse with water, passing it through a sieve, washing, adding an alkali, bleaching, and drying it, then grinding it into powder, sifting it, and molding it dry by great pressure, substantially as described.

3. The process of forming a substance from the refuse remaining after the manufacture of potato-flour, which consists in mixing the said refuse with water, passing it through a sieve, washing, bleaching, and drying it, adding a suitable waterproofing material such as pitch, gum, varnish, or the like, then grinding it into powder, sifting it, and molding it dry by great pressure, substantially as described.

4. As a new article of manufacture a hard substance, formed from a powder made from the refuse of potato-flour factories, substantially as described.

PIETER WICHERS WIERDSMA.
JOHANNES KUIPERS.

Witnesses:
HENRIK VON GOOT,
AUGUST SIEGFRIED DOCEN.